United States Patent [19]
Hehl

[11] 4,437,131
[45] Mar. 13, 1984

[54] LOCKING DEVICE FOR THE TAPE CASSETTE COMPARTMENT OF A MAGNETIC TAPE APPARATUS

[76] Inventor: Karl Hehl, Arthur-Hehl-Strasse 32, 7298 Lossburg 1, Fed. Rep. of Germany

[21] Appl. No.: 333,915

[22] Filed: Dec. 23, 1981

[30] Foreign Application Priority Data

Dec. 23, 1980 [DE] Fed. Rep. of Germany ....... 3048790

[51] Int. Cl.[3] .............................................. G11B 1/00
[52] U.S. Cl. ............................ 360/96.6; 16/DIG. 13; 292/173; 292/336.3; 292/DIG. 31; 292/DIG. 38; 360/137
[58] Field of Search .................. 16/DIG. 13; 292/165, 292/167, 169 R, 173, 336.3, DIG. 31; 360/96.6, 137

[56] References Cited

U.S. PATENT DOCUMENTS 4,017,902  4/1977  Sato ..................................... 360/137

FOREIGN PATENT DOCUMENTS 2306497  10/1976  France ............................... 360/137

*Primary Examiner*—George G. Stellar
*Attorney, Agent, or Firm*—Joseph A. Geiger

[57] ABSTRACT

A locking device for the pivotable tape cassette compartment of a magnetic tape apparatus comprising a radially open detent groove in the side wall of the cassette compartment and a cooperating detent pin on a radially movable spring-engaged detent slide. The release movement of this detent slide is obtained by means of a detent release button which is formed by a hinged integral wall portion of the flat front wall of the casing, the release button carrying on its inner side a cam protrusion in engagement with a cam follower on the detent pin. The casing of the unit and its chassis have snap-action mounting features.

9 Claims, 5 Drawing Figures

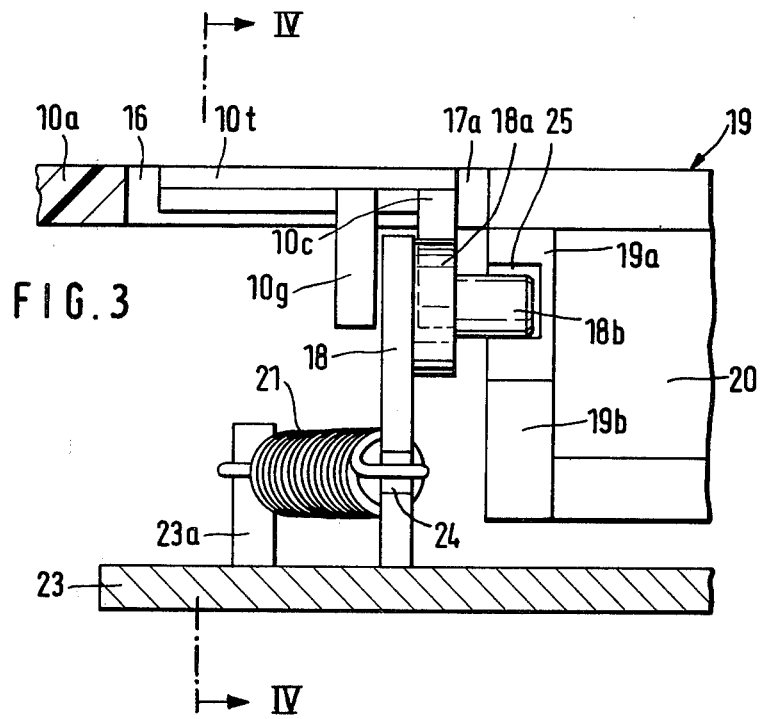
F I G. 3
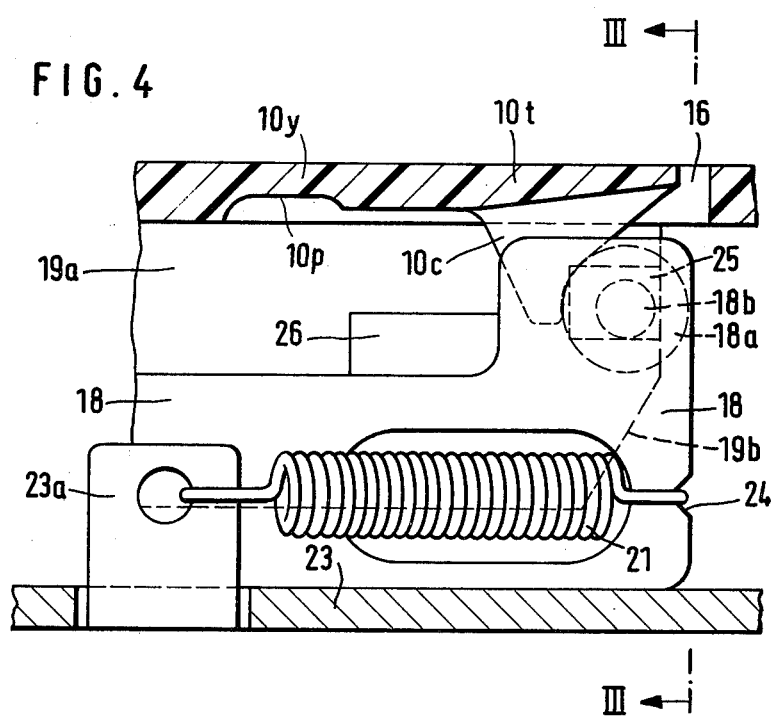
F I G. 4

LOCKING DEVICE FOR THE TAPE CASSETTE COMPARTMENT OF A MAGNETIC TAPE APPARATUS

BACKGROUND OF THE INVENTION

1. Field of the Invention

The present invention relates to a manually releasable spring-engaged locking device or detent and, more particularly, to a detent mechanism for a pivotable tape cassette compartment of a magnetic tape apparatus which engages itself when the compartment is pivoted into its normal position and which, following manual disengagement, allows the spring-biased compartment to pivot outwardly from the apparatus, for the insertion or removal of a magnetic tape cassette.

2. Description of the Prior Art

Locking devices and detent mechanisms of this type are known from the prior art. They are adapted to the specific structure of the magnetic tape apparatus and especially to the configuration of the tape cassette or tape cassette compartment, as the case may be.

One such configuration, to which this invention is addressed as a preferred application, features a rectangular casing with a flat front wall and a rectangular aperture in the front wall which is occupied by a matching tape cassette compartment. This cassette compartment has a pivot support on one of its two long sides, being carried by a flat chassis of the apparatus and biased to pivot outwardly from the front wall by means of a preloaded spring which is arranged between the cassette compartment and the chassis. The chassis itself is arranged parallel to the casing front wall, at a distance from the latter, carrying the mechanical and electronic working components of the magnetic tape apparatus, including a detent mechanism for the tape cassette compartment.

This known detent mechanism includes a detent groove near the distal end of a short side of the cassette compartment. The lower flank of this detent groove is engageable by a detent pin, which thereby retains the cassette compartment in its normal position in which its outer surface is flush with the outer surface of the casing front wall. The detent pin, extending parallel to the pivot axis of the cassette compartment, is part of a detent slide which is guided for straight-line movements of the detent pin towards and away from the compartment pivot axis. A detent spring urges the detent slide towards the compartment pivot axis, thereby maintaining the detent pin engaged in the detent groove.

For the manual release of this detent mechanism, the prior art apparatus features a slidable release lever which is guided by the casing front wall for movements parallel to the detent slide. This lever includes a finger-engageable button on the outside of the front wall, a lever shaft reaching through a longitudinal guide slot in the front wall, a laterally offset entrainment head on the extremity of the lever shaft, and a guide bracket engaging the lever shaft as a guide counterpart to the button on the inside of the front wall. At assembly, the guide bracket is snapped over the lever shaft, being held in place by means of opposing retaining tongues which engage a shoulder of the lever shaft.

This configuration has the disadvantage of having the button of the release lever as the only part which protrudes over the otherwise even top surface of the magnetic tape apparatus. Additionally, the parts which constitute the release lever are complex in structure and therefore comparatively costly in terms of tooling, if injection-molded in mass production. A removal of the release lever is only possible with considerable skill and the aid of tiny prying tools which must be engaged under the retaining tongues of the guide bracket.

SUMMARY OF THE INVENTION

Underlying the present invention is the objective of devising an improvement in connection with the described locking device or detent mechanism for a tape cassette compartment which improvement, by eliminating the slidable release lever as a separate part, also eliminates its protruding button, thereby reducing manufacturing and assembly costs, while simplifying the manual detent release action.

The present invention proposes to attain this objective by suggesting an improved locking device for the pivotable cassette compartment in which the prior art release lever is replaced by a detent release button in the form of a resiliently depressible wall portion of the flat front wall of the casing of the magnetic tape apparatus. This depressible wall portion is separated from the remainder of the casing front wall on all but one side, where its attachment to the wall forms a resilient bending hinge. The detent release button and the detent slide are operatively connected by suitable displacement transmission means, so that a depression of the release button produces a radial movement of the detent slide away from the compartment pivot axis, disengaging the detent pin from the detent groove.

In a preferred embodiment of the invention, the detent release button carries on its underside an upstanding rib protrusion which serves as a release cam, cooperating with a cam follower on the detent slide. This cam follower is preferably arranged directly on the detent pin. By arranging on the release button a second parallel-spaced rib protrusion, it is possible to additionally guide for the detent slide between the two protrusions.

The release cam is preferably so shaped that it also serves as an abutment for the detent slide, determining the engaged position of the detent pin, under the bias of the detent spring. For this purpose, the release cam includes a hump-like extremity on which the cam face terminates in perpendicular orientation, to form a stop for the cam follower on the detent slide.

The resilient bending hinge of the detent release button is preferably a wall portion of reduced thickness, defined by a shallow groove on the inside of the front wall. The wall portion which forms the release button is preferably rectangular and arranged adjacent to the right side wall of the cassette compartment, the bending hinge extending perpendicularly thereto, at approximately mid-length of the compartment side wall.

In addition to being simpler in structure and therefore more economical, the proposed improved detent mechanism is also ergonomically more advantageous, replacing a sliding movement under finger pressure by a simple pushbutton actuation of the detent release.

A major advantage of the present invention resides in the fact that the casing of the magnetic tape apparatus no longer has any protruding parts on its front face, when the tape cassette compartment is in its normal position. This advantage may be very valuable in connection with the incorporation of one or several of these magnetic tape units in the control panel of a processing machine, for the storage and timed release of processcontrol signals as, for example, in an injection molding machine, for the control of the injection cycle. Safety considerations require that the control panel, which contains also various gauges and other electronic instruments, be accessible to authorized maintenance personnel only. For this purpose, the control panel is secured behind a glass door which must be spaced as closely as possible to the faces of the instruments to minimize reading distortions. The absence of protrusions on the faces of the magnetic tape units thus makes it possible to further approach the glass door.

The use of recessed snap-action mounted instrument casings of the type described in German Pat. No. 27 57 959 and in the corresponding U.S. Pat. No. 4,209,154 further improves the configuration of such a secured control panel in conjunction with the present invention. By arranging the protrusion-free casing of the magnetic tape unit in accordance with the teaching of these patents, it is possible to space the glass door as closely from the surface of the control panel as the mere thickness of the casing front wall. In this case, the rectangular casing has four side walls forming a frame that fits snugly into a rectangular panel opening, while flexible locking tongues on the side walls engage the panel wall from behind, so that only the larger front wall of the casing remains on the outside of the control panel. The chassis of the magnetic tape unit is preferably insertable into the casing of the tape unit from the opposite side in a similar snap-action assembly procedure.

BRIEF DESCRIPTION OF THE DRAWINGS

Further special features and advantages of the invention will become apparent from the description following below, when taken together with the accompanying drawings which illustrate, by way of example, an embodiment of the invention represented in the various figures as follows:

FIG. 3 shows enlarged details of the compartment locking device in a section taken along line III—III of FIG. 1 or FIG. 4;

FIG. 4 shows the compartment locking device of FIG. 3 in a section taken along line IV—IV of FIG. 1 or FIG. 3.

DESCRIPTION OF THE PREFERRED EMBODIMENT

Figure 1:
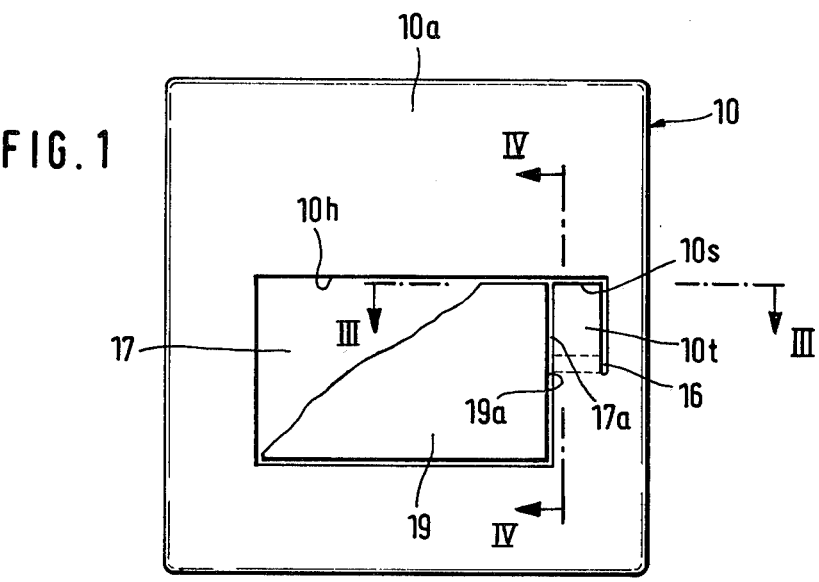
FIG. 1 shows, in a frontal view, a casing for a magnetic tape unit with a pivotable tape cassette compartment and a compartment locking device embodying the invention.

The locking device or detent mechanism of the invention serves to releasably retain a tape cassette compartment 19 in its normal position in which its outer surface is aligned flush with the outer surface of the casing 10 of a magnetic tape unit. In this position, the rectangular cassette compartment 19 occupies a matching aperture 17 in the front wall 10a of the casing 10, as can be seen in FIG. 1.

The cassette compartment 19 is pivotably supported on a chassis 23 of the unit, being subjected to the force of a preloaded spring (not shown) which is arranged between it and the chassis 23. This spring will pivot the cassette compartment outwardly, away from the aperture 17 of the front wall 10a, when the detent mechanism is released, for the insertion and/or removal of a magnetic tape cassette on the distal, upwardly open side of the cassette compartment 19. The tape cassette (not shown) fits into the cassette space 20 (FIG. 3) of the cassette compartment 19.

As can be seen in FIGS. 3 and 4, the chassis 23 of the magnetic tape unit is a plate which extends parallel to the front wall 10a of the casing 10 of the unit, at a distance from the latter. Besides other components of the unit, the chassis 23 also carries a detent slide 18 which is guided by a guide member 26 (FIG. 4) for movements parallel to the right-hand side wall 19a of the cassette compartment 19, which movements are radial with respect to the compartment pivot axis (not shown). A detent spring 21 urges the detent slide 18 in the direction of engagement, i.e. towards the compartment pivot axis. The detent slide 18 is a sheet metal stamping. The detent spring 21 engages a notch 24 in the distal edge of the slide 18 and a hole in an upstanding lug 23a of the chassis 23.

The detent slide 18 carries near its distal extremity a detent pin 18b which extends parallel to the compartment pivot axis and is normally engaged in a detent groove 25 in the side wall 19a of the cassette compartment 19. FIG. 3 shows that the detent pin 18b abuts against the lower flank of the detent groove 25, which thereby serves as a detent shoulder. The detent groove extends parallel to the outer face of the cassette compartment 19, i.e. radially with respect to its pivot axis, being open at its distal end, for engagement and release by the detent pin 18b.

The detent mechanism is releasable manually by means of a detent release button 10t in the form of an integral portion of the front wall 10a of casing 10 which is of rectangular outline and separated from the front wall 10a on three of its four sides, the fourth side forming a resilient bending hinge 10y. One longitudinal edge of the detent release button 10t coincides with a short side of the wall aperture 17, forming a gap 17a with the compartment side wall 19a. The other longitudinal edge and the distal transverse edge are formed by slits 16 (FIG. 1 and FIG. 4). The bending hinge 10y, accordingly, extends perpendicularly to the compartment side wall 19a, at approximately midlength of the latter.

The release button 10t is thus depressible, i.e. pivotable inwardly from the casing front wall 10a, about its bending hinge 10y. At least some portions of the wall of the button 10t may be of reduced thickness, especially that portion on its attached side which forms the bending hinge 10y. There, the wall may have a shallow groove 10p, in order to localize the bending hinge 10y. However, all thickness reduction is on the inside of the wall, so that the outer surface of the button 10t is normally in alignment with the plane defined by the outer surface of the casing front wall 10a and the outer surface of the cassette compartment 19. The casing 10 being injection-molded of resilient plastic, the bending hinge 10y of the release button 10t also conveniently serves as a return spring for the button 10t.

Figure 5:
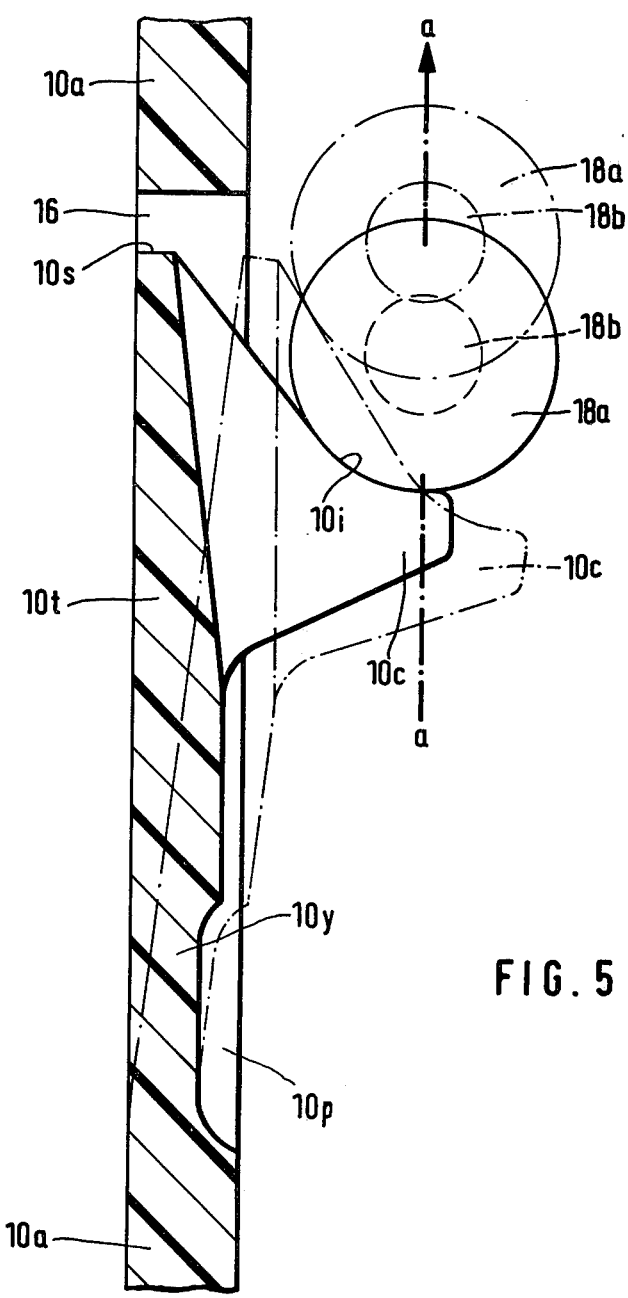
FIG. 5 shows, in a further enlarged detail of FIG. 4, the cam and cam follower action in the release of the compartment locking device of the invention.

As can be seen in FIGS. 3 and 4, the release button 10t has on its inner side a pair of parallel rib protrusions 10c and 10g which extend perpendicularly to the casing front wall 10a and to the compartment pivot axis. The rib protrusion 10c, which is located at the edge of the wall aperture 17, serves as a release cam, in cooperation with a cam follower 18a which is carried by the detent pin 18b. The release cam has a cam profile 10i which decreases to zero height at the distal edge 10s of the release button 10t, as can be seen in FIGS. 4 and 5. The space between the rib protrusions 10c and 10g serves as a guide slot for the upper edge of the detent slide 18.

FIG. 5 illustrates the interaction between the cam profile 10i on the release cam of the release button 10t and the cam follower 18a on the detent pin 18b of the detent slide 18. When the release button 10t is depressed under finger pressure, as shown by stippled lines, it executes a pivoting motion about its bending hinge 10y, thereby displacing the cooperating cam follower 18a in the direction of the arrow a, i.e. radially outwardly, by advancing an inclined face portion of its cam profile 10i against the cam follower 18a.

The outward displacement of the detent pin 18b disengages it from the detent groove 25 (FIG. 4), so that the cassette compartment 19 is free to execute an outward pivoting movement about its pivot axis, under the action of a preloaded spring (not shown). As soon as the finger pressure is removed from the release button 10t, the latter returns to its normal flush position, allowing the detent slide 18 to return to its engagement position, under the action of the detent spring 21.

In order to return the cassette compartment 19 to its normal position in engagement with the detent pin 18b, it is not necessary to actuate the release button 10t, as the compartment side wall 19 has an inclined entry cam 19b at its distal end face with which it displaces the detent pin 18b radially outwardly. The entry cam 19b cooperates with the detent pin 18b in much the same way as the cam profile 10i of the release button 10t cooperates with the cam follower 18a. As the detent groove 25 reaches alignment with the detent pin 18b, the latter snaps into the groove, in a radial return movement of the detent slide 18 under the action of the spring 21.

The casing 10 of the magnetic tape unit is a snap-action mountable casing of the type which is disclosed in my U.S. Pat. No. 4,209,154. It is especially adapted for the recessed mounting of instruments and control units in the wall of a control panel, behind a closely spaced glass door, so as to be accessible to authorized personnel only. Enclosed control cabinets of this type are necessary in conjunction with certain processing machines, for example, injection molding machines.

Figure 2:
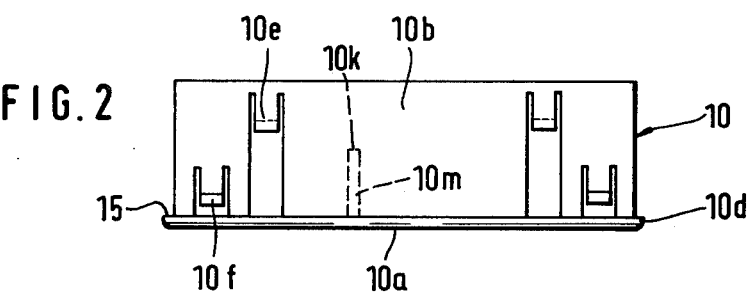
FIG. 2 shows the magnetic tape unit of FIG. 1 in a side view.

The casing 10 of the magnetic tape unit is of rectangular shape, having four frame walls 10b which extend at right angles to the front wall 10a so as to form a short tubular casing frame of rectangular outline. The front wall 10a exceeds this rectangular outline by a small margin, to form a rim flange 10d with a circumferential mounting shoulder 15 (FIG. 2). The wall of a control panel (not shown) into which the magnetic tape unit is to be inserted has a square opening which fits snugly over the outer dimensions of the casing frame.

At least two frame walls 10b of the casing frame have inwardly deflectable locking tongues 10f which, in their normal position, extend a small distance beyond the frame outline, forming abutment noses at a distance from the shoulder 15 which corresponds to the thickness of the control panel wall. Accordingly, when the casing 10 is inserted into its control panel opening, the edges of the latter ride up against the locking tongues 10f, deflecting them inwardly, until the mounting shoulder 15 is in abutment contact with the control panel, at which point the locking tongues 10f snap back out, to engage the control panel from behind.

The casing 10 provides for the chassis 23 of the tape unit to be mounted inside the casing frame in a similar snapaction procedure. This is accomplished by means of a second set of locking tongues 10e in at least two of the frame walls 10b. Unlike the locking tongues 10f which protrude outwardly, the locking tongues 10e protrude inwardly from the frame walls 10b, at a distance from a plurality of chassis-supporting ribs 10m which corresponds to the thickness of the chassis 23. The outline of the latter matches the interior contour of the casing frame, thus deflecting the locking tongues 10e outwardly during insertion. Once inserted, the chassis 23 is firmly held in place between the edges 10k of the supporting ribs 10m and the abutment noses of the locking tongues 10e.

The incorporation of the described snap-action assembly features in the magnetic tape unit greatly simplifies the assembly of the unit and the insertion of the latter into the control panel. In this context, there exists a choice in the sequence in which the snap-action assembly procedures are performed. It is possible, on the one hand, to first insert the chassis 23 with its cassette compartment 19 and associated tape drive components and electronic circuitry into the casing 10, followed by the insertion of the assembled tape unit into the control panel. On the other hand, it is also possible to first mount the empty casing 10 in the opening of the control panel and to subsequently insert the chassis sub-assembly into the casing from the rear side of the control panel.

It should be understood, of course, that the foregoing disclosure describes only a preferred embodiment of the invention and that it is intended to cover all changes and modifications of this example of the invention which fall within the scope of the appended claims.

I claim the following:

1. A locking device for the tape cassette compartment of a magnetic tape apparatus intended for storing and reproducing information, which cassette compartment is mounted on a chassis of the tape apparatus to be pivotable outwardly by the action of a preloaded spring, on a pivot axis which is parallel and proximate to a longitudinal side wall of the cassette compartment, the cassette compartment being arranged in the aperture of a flat front wall of the apparatus which is parallel to the chassis and has an outer surface in the same plane as the outer surface of the cassette compartment in its normal position, the chassis carrying a detent slide which is provided with a detent member and guided for straight-line movements perpendicular to the pivot axis of the cassette compartment and parallel to the plane of the front wall, said detent member engaging a detent shoulder of the cassette compartment to maintain the later in its normal position, being disengageable from the detent shoulder through a release movement of the detent slide in opposition to the action of a detent return spring, the improvement therein comprising:

a detent release button defined by a portion of the front wall which is separated from the surrounding front wall along a major part of its circumference, the attached minor part of its circumference forming a bending hinge, so that a distal portion of the detent release button is depressible toward the inside of the apparatus; and means defined by the depressible portion of the detent release button and the detent slide for driving the detent slide in a release movement, in response to a depression of the detent release button.

2. A locking device in accordance with claim 1, wherein
    the cassette compartment and the aperture in the front wall have matching rectangular outlines and the circumference of the detent release button is likewise rectangular, having one edge coinciding with a side of said front wall aperture.
3. A locking device in accordance with claim 2, wherein
    the detent release button is at least in part less thick than the front wall and its surface lies in the plane of the surface of the front wall.
4. A locking device in accordance with claim 2, wherein
    the bending hinge of the detent release button comprises a shallow groove at its attached side.
5. A locking device in accordance with claim 1 or claim 2 or claim 4, wherein
    the detent slide driving means includes a control cam on the underside of the depressible portion of the detent release button and a cooperating cam follower on the detent slide;
    the detent member of the detent slide is a detent pin extending parallel to the pivot axis of the cassette compartment, the cam follower being rotatably supported on the detent slide; and
    the control cam is formed by a rib protrusion on the detent release button which is disposed at right angles to the wall of the latter, engaging the periphery of the cam follower.
6. A locking device in accordance with claim 5, wherein
    the detent shoulder is the lower flank of a detent groove in the side wall of the cassette compartment which faces towards the detent release button.
7. A locking device in accordance with claim 5, wherein
    the detent slide is a flat sheet metal stamping;
    the detent pin extends at a right angle to the detent slide, being secured at one end to the detent slide; and
    the cam follower is arranged for rotation on the detent pin and axially positioned by the detent slide.
8. A locking device in accordance with claim 7, wherein
    the detent release button has arranged on its underside a second rib protrusion extending parallel to the control cam; and
    the detent slide is guided on its upper edge between the rib protrusion of the control cam and said second rib protrusion.
9. A locking device in accordance with claim 5, wherein
    the detent release button includes means for abutting the spring-biased detent slide, thereby determining the engaged position of the detent pin.

* * * * *